United States Patent Office 3,514,148
Patented May 26, 1970

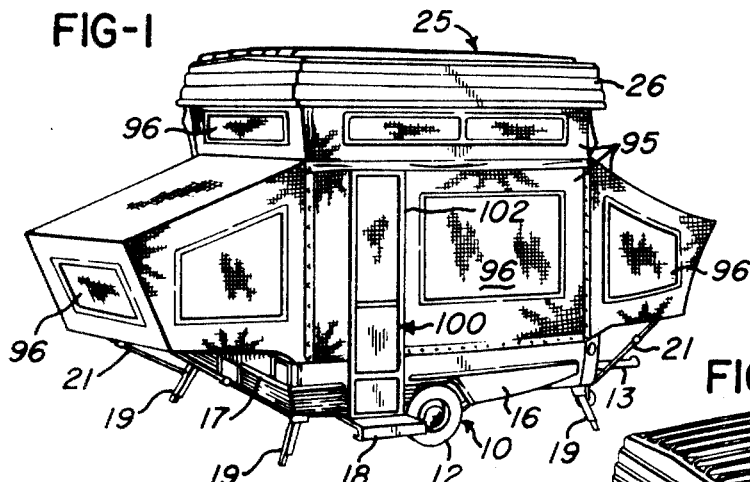
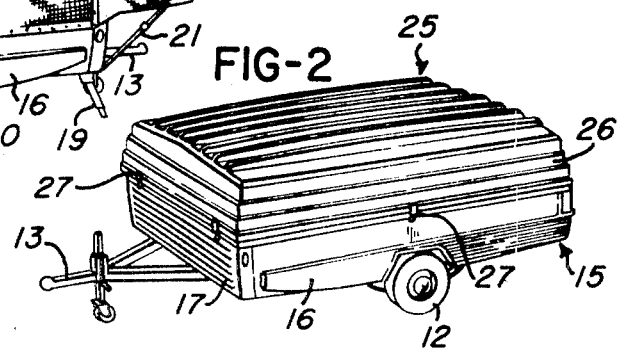
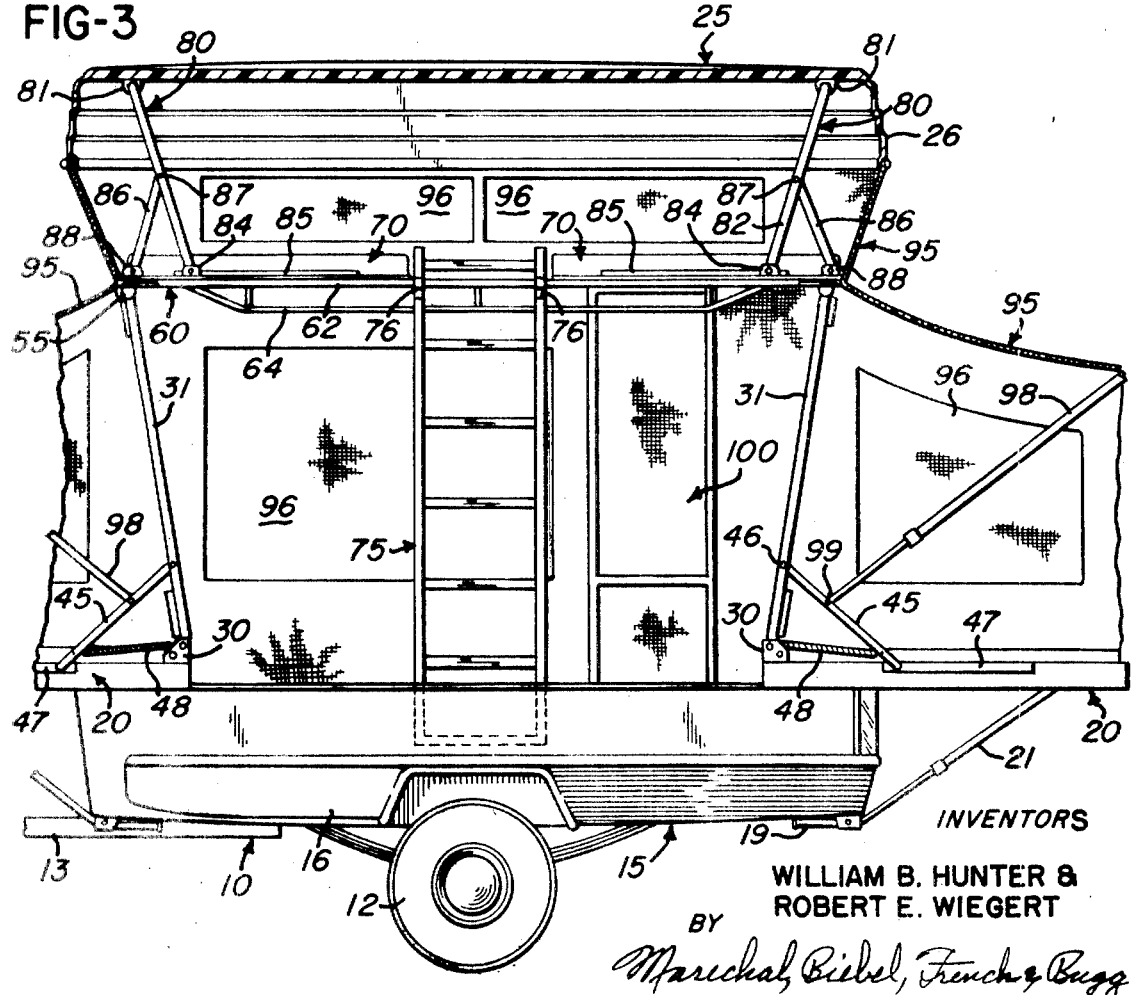
INVENTORS
WILLIAM B. HUNTER &
ROBERT E. WIEGERT
BY Marechal, Biebel, French & Bugg
ATTORNEYS

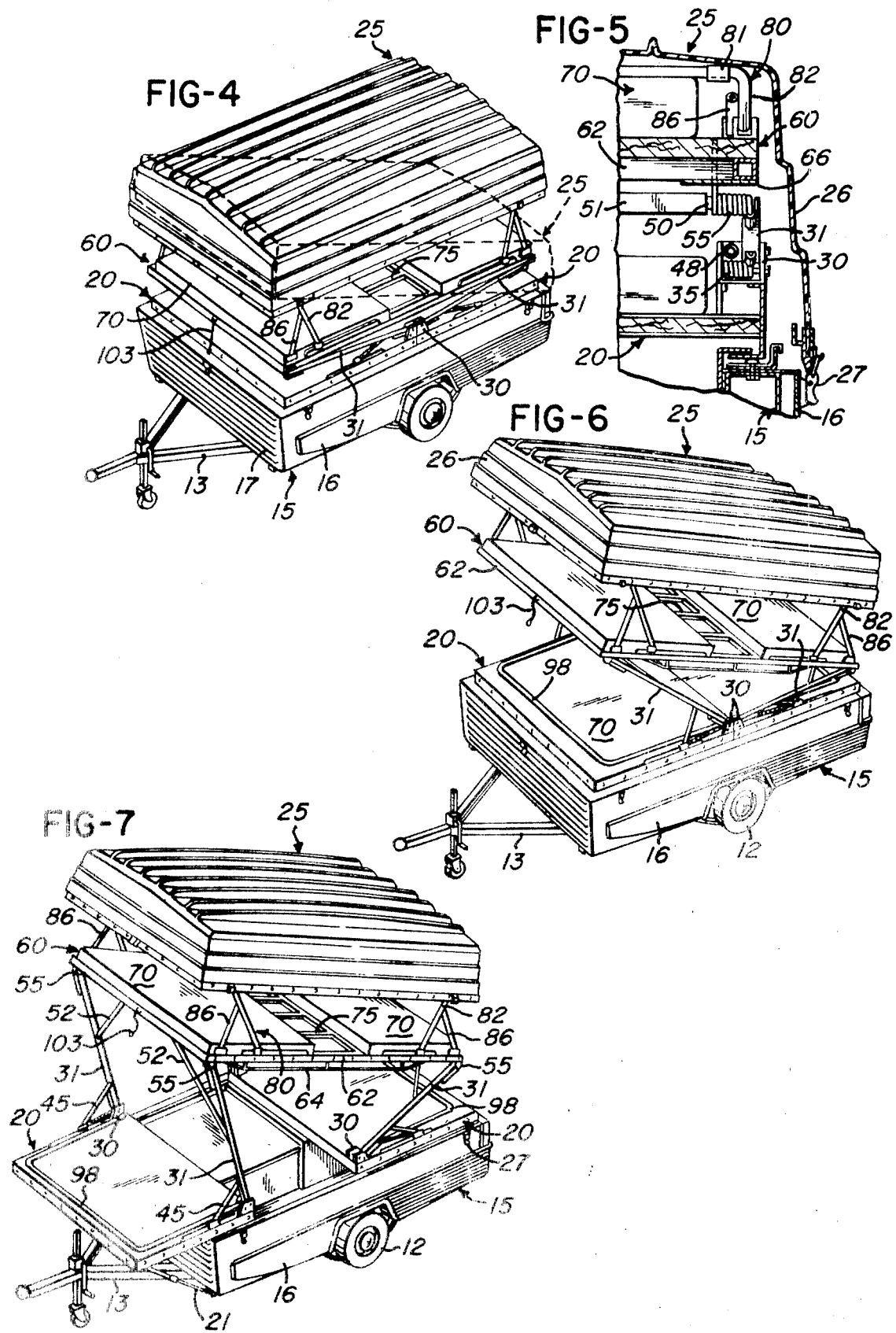

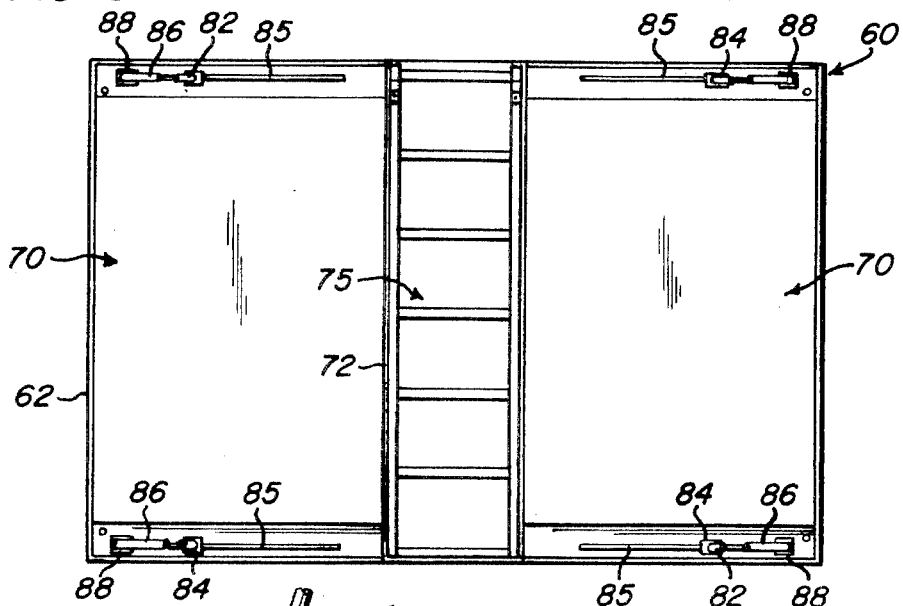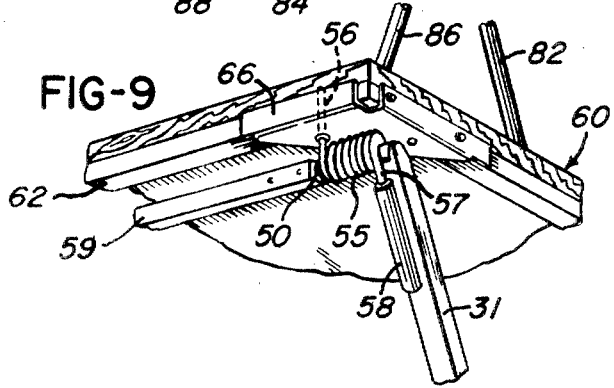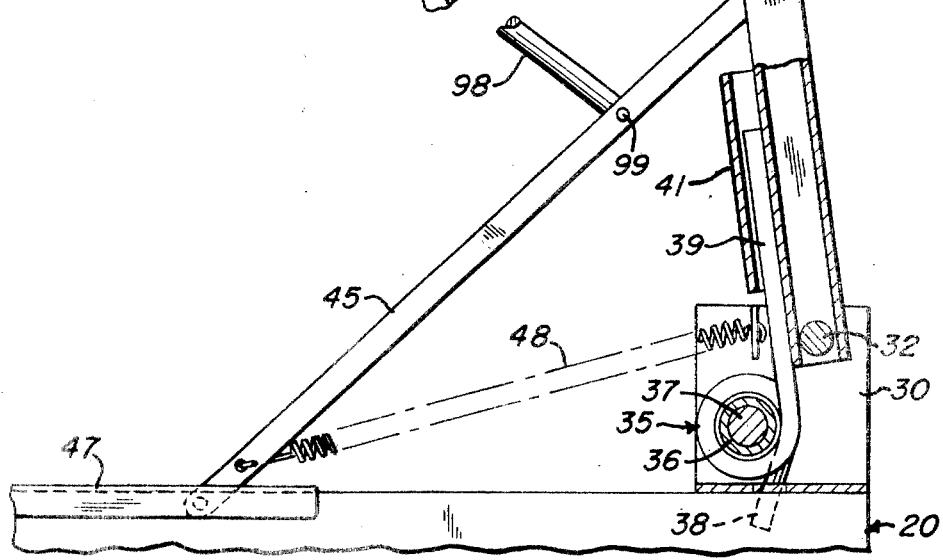

3,514,148
CAMPING TRAILER
William B. Hunter, Hamilton, and Robert E. Wiegert, Middletown, Ohio, assignors to Ward Manufacturing, Inc., Hamilton, Ohio, a corporation of Ohio
Filed Feb. 27, 1968, Ser. No. 708,616
Int. Cl. B60p 3/34
U.S. Cl. 296—23            10 Claims

ABSTRACT OF THE DISCLOSURE

A collapsible camping trailer has a body, a cover for the body, a pair of lower beds and an upper bed platform. The cover is supported by pivotal legs for movement between a collapsed position adjacent the platform and an elevated position spaced above the platform, the lower beds are movable between retracted positions over the body and extended positions projecting outwardly from the body, and the platform is supported by spring biased pivotal legs connected to the lower beds for movement in response to movement of the lower beds between a collapsed position adjacent the lower beds and an elevated position spaced above the head of a person standing within the body.

Background of the invention

In a collapsible camping trailer, it is common to employ a two-wheel chassis supporting a generally rectangular body on which a pair of opposing beds are slidable between retracted positions directly over the body and extended positions projecting outwardly from opposite sides or ends of the body. It is also common to provide the trailer with a rigid top or cover which is movable between a collapsed position covering the trailer and an elevated position where the cover cooperates with canvas side walls to form an enclosed sheltered area above the trailer. Commonly, the outer corners of the cover are connected to the inner corners of the beds by a set of pivotal legs so that the cover moves between its collapsed and elevated positions in response to movement of the beds between their retracted and extended positions.

While the pair of extendable beds provides two double beds, it is sometimes desirable to have additional beds. Accordingly, some camping trailers are provided with collapsible canvas cots which may be placed in position over the extended beds to provide, in effect, a pair of bunk beds. These upper cots or beds are usually dismantled and stored within the trailer body prior to collapsing the trailer. It is also common to provide additional beds for a camping trailer by erecting one or more cots over the floor. These cots are usually removed or dismantled each morning to provide for use of the trailer during the daytime.

Summary of the invention

The present invention is directed to an improved collapsible camping trailer of the character described above and including an upper bed loft which automatically moves to an elevated position spaced above the head of a person standing on the floor of the trailer body when the trailer is erected. In accordance with a preferred embodiment of the invention, the upper bed platform is supported by a set of legs which are pivotally connected to the inner corners of the lower beds so that when the lower beds move between their retracted and extended positions, the upper bed platform moves between its collapsed and elevated positions.

The trailer further includes a substantially rigid cover which is supported by a set of legs pivotally and slidably connected to the upper bed platform so that the cover may be moved between collapsed and elevated positions relative to the upper bed platform to provide an overall compact assembly when the trailer is completely collapsed and sufficient head room above the upper bed platform when the trailer is erected. Preferably, the upper bed platform has a rectangular configuration slightly smaller than that of the trailer body and incorporates a pair of beds which are spaced apart to define an access passage therebetween.

A ladder is normally stored within the passage and is movable to an upright position where it forms a brace for one side of the platform in addition to providing steps for access to the upper beds. A torsion coil spring is associated with each end of each leg supporting the upper bed platform and provides a spring assist for each leg so that the platform may be conveniently elevated in response to moving the lower beds from their retracted positions to their extended positions.

Brief description of the drawings

FIG. 1 is a perspective view of an erected camping trailer constructed in accordance with the invention;
FIG. 2 is a perspective view of the trailer shown in FIG. 1 in its completely collapsed condition;
FIG. 3 is a side elevational view of the same trailer with the forward wall broken away to show the internal structure;
FIG. 4 is a perspective view similar to FIG. 2 with the canvas cover removed and illustrating the first step of erecting the camping trailer;
FIG. 5 is a fragmentary vertical section taken through the top side portion of the collapsed trailer shown in FIG. 2;
FIG. 6 is a perspective view of the trailer with the canvas cover removed and showing the position after platform hold down straps are released;
FIG. 7 is a perspective view of the trailer with the canvas cover removed and showing one of the lower beds extended;
FIG. 8 is a plan view of the upper bed platform showing the ladder in its stored position;
FIG. 9 is a fragmentary perspective view of one corner of the upper bed platform and its connection with a supporting leg; and
FIG. 10 is a fragmentary elevational view in part section of one platform support leg and its mounting on a lower bed.

Description of the preferred embodiment

The camping trailer shown in FIGS. 1–3 includes a chassis 10 having a pair of spring mounted wheels 12 and an extending tow bar 13 adapted to be attached to a hitch mounted on a towing vehicle. A generally rectangular body 15 having side walls 16 and end walls 17 is mounted on the chassis 10 and one of the sides is provided with a door 18 having a lower portion hinged to the body for movement between a position flush with the adjacent side wall 16 and a lowered position (FIG. 1) where it forms a step for ascending to the floor of the body 15. Retractable jacks 19 are mounted on the lower corners of the body 15 and are adapted to be lowered and extended (FIG. 1) for stabilizing the body after the trailer is parked at a camping site.

A pair of lower beds 20 (FIG. 3) are slidably mounted on the body 15 and move horizontally between retracted positions (FIGS. 4 and 6) and extended positions (FIGS. 1 and 3) where the beds are provided with braces 21 which extend upwardly from the jacks 19. A top or cover 25 having a rectangular configuration substantially the same as the body 15, and preferably formed of substantially rigid thermoplastic material, extends over the beds 20 when they are in their retracted positions and has a depending peripheral skirt 26 (FIGS. 2, 3 and 5) which is releasably secured to the body 15 by a series of toggle clamps 27.

A pair of U-shaped metal brackets 30 (FIGS. 3, 7 and 10) are rigidly mounted on the inner corners of each bed 20 and support a set of four legs 31 each having a lower end portion pivotally connected to the corresponding bracket 30 by a bolt 32 (FIG. 10). A torsion coil spring 35 is also mounted on each bracket 30 and is supported by a tubular bushing 36 mounted on a bolt 37. Each spring 35 has one end portion 38 which extends through a hole formed within the corresponding bracket 30 and an opposite end portion 39 which is secured to the adjacent lower end portion of the corresponding leg 31 by a U-shaped bracket 41 welded to the leg.

A brace 45 (FIG. 10) is associated with each leg 31 and has one end pivotally connected to the leg by a bolt 46 and an opposite end slidably supported by a track 47 mounted on the adjacent edge portion of the corresponding bed 20. A tension spring 48 connects the sliding end of each brace 45 with the corresponding bracket 30 and supplements the spring 35 to urge the corresponding leg 31 towards a generally upright position shown in FIG. 10.

A shaft 50 (FIG. 9) is rigidly connected to the upper end of each leg 31, and the shafts 50 for the pair of legs 31 associated with each bed 20 are rigidly connected by a square tubular cross bar 51 and angle braces 52 (FIG. 7) so that each pair of legs move as a unit. A torsion coil spring 55 (FIG. 9) is mounted on a bushing supported by each shaft 50 and has one upwardly projecting end portion 56 and an opposite end portion 57 which is secured to the adjacent leg 31 by a U-shaped bracket 58. The upper bed loft or platform 60 is supported by the set of legs 31 and has a rectangular configuration slightly smaller than that of the body 15 and cover 25.

The platform 60 includes a rectangular frame 62 which is reinforced by longitudinally extending braces 64 (FIG. 3) and corner gusset plates 66 each having a hole to receive the upper end portion 56 of the adjacent spring 55. The corner gusset plates 66 of the frame 62 are held adjacent the springs 55 by hat-shaped shroud brackets (not shown) which extend around the springs 55 and are spot welded to the underneath surface of the plates 66 after the platform 60 is assembled in position as shown in FIG. 9. The springs 55 cooperate with the springs 35 and 48 and the legs 31 to assist the movement of the upper bed platform 60 between a collapsed position (FIG. 4) directly above the retracted beds 20 and an elevated position (FIG. 3) about six feet above the floor of the body 15 in response to movement of the beds between their retracted and extended positions.

The upper bed platform 60 includes a pair of double beds 70 (FIGS. 6 and 7) which are spaced apart to define a rectangular opening 72 providing access to the upper beds 70 from the body 15. A ladder 75 is normally stored horizontally within the opening 72 between the beds 70 and is movable to an upright position (FIG. 3) where the lower end of the ladder is supported by the floor of the body 15. Angle brackets 76 are mounted on the upper end of the ladder to receive one side of the platform frame 62 to that the ladder provides a center brace for the upper platform 60 in its elevated position.

A pair of inverted U-shaped bows 80 (FIG. 3) are pivotally connected to the underneath surface of the cover 25 by a set of U-shaped brackets 81. Each bow 80 includes a pair of legs 82 having lower end portions pivotally connected to U-shaped brackets 84 which are slidably mounted on tracks 85 (FIG. 8) extending adjacent the longitudinal edges of the platform 60. A set of links or braces 86 (FIG. 3) are provided for the legs 82, and each brace 86 has one end pivotally connected by a bolt 87 to the corresponding leg 82 and its opposite end pivotally connected to a U-shaped bracket 88 mounted on the adjacent corner of the platform 60. Thus the cover 25 is movable between a collapsed position (FIGS. 2 and 5) and an elevated position (FIGS. 3 and 4) where the cover is supported above the upper bed platform 60 by the legs 82 and braces 88. Releasable spring clips (not shown) are mounted on the tracks 85 for retaining the sliding brackets 84 in their positions shown in FIG. 3.

Referring to FIGS. 1 and 3, a flexible canvas cover 95 having screened windows 96 is attached to the periphery of the skirt portion 26 of the cover 25 and extends downwardly to the periphery of the upper bed platform 60 where the cover 95 is releasably attached by a series of snaps (not shown). From the periphery of the upper bed platform 60, the canvas cover 95 extends downwardly for attachment by snaps to the sides 16 of the trailer body 15 and downwardly over retractable U-shaped bows 98 (FIG. 3) to three sides of each lower bed 20. Each of the bows 98 which support the canvas cover 95 over the beds 20 has its lower end portion pivotally connected to one of the corresponding pair of braces 45 (FIGS. 3 and 10) by bolts 99. A screen door 100 (FIG. 1) hinged to a frame 102 is set in place over the door 18 to provide access to the area enclosed by the top 25 and canvas cover 95.

To erect the camping trailer from its completely collapsed condition shown in FIG. 2 to its erected condition shown in FIGS. 1 and 3, the toggle clamps 27 are first released, and each end of the cover 25 is lifted to an elevated position as shown in FIG. 4. Hold down straps 103 (FIG. 4) located at the center of each end wall 17 of the trailer body 15 are released, which allows the upper bed platform 60 to rise to the approximate position shown in FIG. 6 under the biasing forces exerted by the springs 35, 48 and 55. For purposes of illustrating the erection of the camping trailer and its internal structure, the flexible canvas cover 95 has been removed in FIGS. 4, 6 and 7.

Once the camping trailer is in the position shown in FIG. 6, if one of the lower beds 20 such as the forward bed is moved to its extended position the trailer assumes the position shown in FIG. 7. After the other bed 20 is extended or if both beds are extended simultaneously, the lower beds 20, the upper bed platform 60 and the cover 25 assume their relative extended and elevated positions as shown in FIG. 3. The bed braces 21 and the cover support bows 98 are then placed in position along with the screen door frame 102. To collapse the trailer, the above steps are simply performed in the reverse order.

From the drawings and the above description, it is apparent that a camping trailer constructed in accordance with the present invention provides several features and advantages. For example, by providing the trailer with the upper bed platform 60 which is movable between a retracted position adjacent the body 15 and an elevated position spaced substantially above the body, the trailer is provided with additional beds which do not have to be dismantled or disassembled or rearranged to provide convenient use of the trailer during the daytime. That is, when the trailer is erected, the upper bed platform 60 is elevated to such an extent that people can easily stand and walk on the floor of the body 15 with ample clearance above their heads.

The support for the bed platform 60 and the rigid cover 25 also provides another desirable feature. That is, with the platform 60 connected to the corners of the beds 20 by the set of legs 31 and with the assistance of the springs 35, 48 and 55, the bed platform 60 can be easily moved to its elevated position in response to extension of the lower beds 20. Moreover, the arrangement of the set of legs 82 and braces 86 enables the rigid cover 25 to be conveniently elevated relative to the upper bed platform 60 before the hold down straps 103 are released and while the cover 25 is at a conveniently accessible elevation.

Another feature is provided by forming the opening 72 within the platform 60 to accommodate the ladder 75 so that the ladder can be conveniently stored when the trailer is collapsed and conveniently moved to a usable upright position where it also serves as a brace for the platform 60. Another important feature is provided by constructing the rigid top 25 with the deep depending skirt 26 so that when the trailer is collapsed, the upper bed platform 60 and the lower beds 20 are entirely enclosed within the cover 25, and the cover skirt 26 overlaps the upper peripheral edge of the body 15 to prevent water from entering between the collapsed cover and the body.

While the form of apparatus herein described constitutes a preferred embodiment of the invention, it is to be understood that the invention is not limited to this precise form of apparatus, and that changes may be made therein without departing from the scope of the invention.

What is claimed is:

1. A camping trailer comprising a wheel-supported body, a cover extending over said body, lower horizontal bed means mounted on said body and movable between a retracted position and an extended position relative to said body, an upper horizontal bed platform positioned between said cover and said lower bed means in said retracted position, means supporting said upper bed platform for vertical movement between a collapsed horizontal position adjacent said lower bed means in said retracted position and an elevated horizontal position spaced above said body, and means supporting said cover for vertical movement between a collapsed position adjacent said platform and an elevated position spaced above said platform.

2. A camping trailer as defined in claim 1 wherein said lower bed means comprises a pair of generally rectangular lower beds, and said supporting means for said upper bed platform include a set of legs pivotally connected to both said platform and said lower beds.

3. A camping trailer as defined in claim 1 wherein said upper bed platform comprises a generally flat rectangular platform having an opening therein providing access to said platform from within the boundaries of said body.

4. A camping trailer as defined in claim 3 wherein said opening is generally rectangular and located within the central portion of said platform, and comprising a ladder positioned within said opening, and means releasably storing said ladder in said opening to provide for moving said ladder to an upright position connecting said platform with said body.

5. A camping trailer as defined in claim 1 including a rigid ladder, and means for retaining said ladder in a generally upright position extending between said body and said platform in said elevated position to provide an intermediate support for said platform.

6. A camping trailer as defined in claim 1 including spring means associated with said supporting means for said platform to facilitate moving said platform between said collapsed and elevated positions.

7. A camping trailer as defined in claim 6 wherein said lower bed means comprises a pair of lower beds, said supporting means for said platform comprises a set of legs each having one end pivotally connected to said platform and another end pivotally connected to one of said beds, said spring means comprises a spring for each said end of each leg, and comprising means for connecting said springs to said legs in a manner to effect cooperation of said springs for biasing said platform towards said elevated position.

8. A camping trailer comprising a wheel-supported body, lower bed means, means supporting said lower bed means for movement between a retracted position over said body and an extended position projecting outwardly from said body, an upper horizontal bed platform, means supporting said platform for vertical movement between a collapsed horizontal position adjacent said lower bed means in said retracted position and an elevated horizontal position spaced substantially above said body in response to movement of said lower bed means between said retracted and extended positions, and collapsible cover means movable between a lowered position adjacent said platform in said collapsed position and a raised position spaced above said platform in said elevated position.

9. A camping trailer as defined in claim 8 wherein said lower bed means comprises a pair of oppositely movable beds, said cover means includes a rigid cover member, and comprising a first set of movable legs connecting said upper bed platform to said beds and disposed to move said platform in response to movement of said beds, and a second set of movable legs connecting said cover member to said upper bed platform and effective to move said cover member between a collapsed position adjacent said platform and an elevated position spaced above said platform.

10. A collapsible camping trailer comprising a wheel-supported body, lower beds means, means supporting said lower bed means for movement between a retracted position over said body and an extended position projecting outwardly from said body, upper bed means, means supporting said upper bed means for vertical movement between a collapsed horizontal position adjacent said lower bed means in said retracted position and an elevated horizontal position spaced above said lower bed means, and cover means collapsible relative to both of said lower and upper bed means.

References Cited

UNITED STATES PATENTS

| | | | |
|---|---|---|---|
| 3,397,007 | 8/1968 | Scheid | 296—27 |
| 2,154,810 | 4/1939 | Goeddertz | 296—23 |

PHILIP GOODMAN, Primary Examiner

U.S. Cl. X.R.

296—27